United States Patent [19]
Chaney

[11] Patent Number: 5,274,436
[45] Date of Patent: Dec. 28, 1993

[54] LASER INTERFEROMETER FOR MEASURING DISTANCE USING A FREQUENCY DIFFERENCE BETWEEN TWO LASER BEAMS

[75] Inventor: Raymond J. Chaney, Berkley, United Kingdom

[73] Assignee: Renishaw plc, Gloucestershire, England

[21] Appl. No.: 614,159

[22] Filed: Nov. 16, 1990

[30] Foreign Application Priority Data

Nov. 24, 1989 [GB] United Kingdom ............. 8926574

[51] Int. Cl.$^5$ ............................................. G01B 9/02
[52] U.S. Cl. ............................ 356/349; 356/358
[58] Field of Search ............. 356/349, 345, 351, 358; 250/227.27

[56] References Cited

U.S. PATENT DOCUMENTS

| | | |
|---|---|---|
| 3,534,292 | 10/1970 | Cutler . |
| 3,881,823 | 5/1975 | De Lang et al. ............... 356/349 |
| 4,278,352 | 7/1981 | Keller ............................ 356/358 |
| 4,627,731 | 12/1986 | Waters et al. .................. 356/349 |
| 4,688,940 | 8/1987 | Sommargren et al. ......... 356/349 |
| 4,762,414 | 8/1988 | Grego ............................. 356/349 |
| 4,767,210 | 8/1988 | Kashyap ..................... 250/227.27 |

FOREIGN PATENT DOCUMENTS 0194941 9/1986 European Pat. Off. .
0321252 6/1989 Fed. Rep. of Germany .
2144215 2/1985 United Kingdom .

OTHER PUBLICATIONS

Absolute Optical Ranging With 200-NM Resolution by Williams et al. Optics Letter 14 (1989) 1 Jun., No. 11, N.Y.

*Primary Examiner*—Samuel A. Turner
*Attorney, Agent, or Firm*—Oliff & Berridge

[57] ABSTRACT

A laser interferometer uses an acousto-optically modulated laser (100) to produce a pair of orthogonally polarized frequency-shifted beams. The beams are passed down a monomode, polarization preserving optical fiber (110) in order to transmit the beams to a cavity (148). The beams are separated at polarizing beam splitter (128) and directed down measuring arm (130) and reference arm (132) of an interferometer. The beat frequency between the reflected beams is detected at photo-detector (146) which outputs a measuring signal (152). This beat frequency is compared to the beat frequency of the beams before entering the interferometer, which is derived by providing a semisilvered mirror (114) and interfering polaroid (116) in the path of the beams up-beam of the interferometer to produce a reference signal (126). The measuring and reference signals are compared to determine the movement of the measuring arm of the interferometer. This method of determining the reference signal makes the apparatus less susceptible to temperature changes.

11 Claims, 1 Drawing Sheet

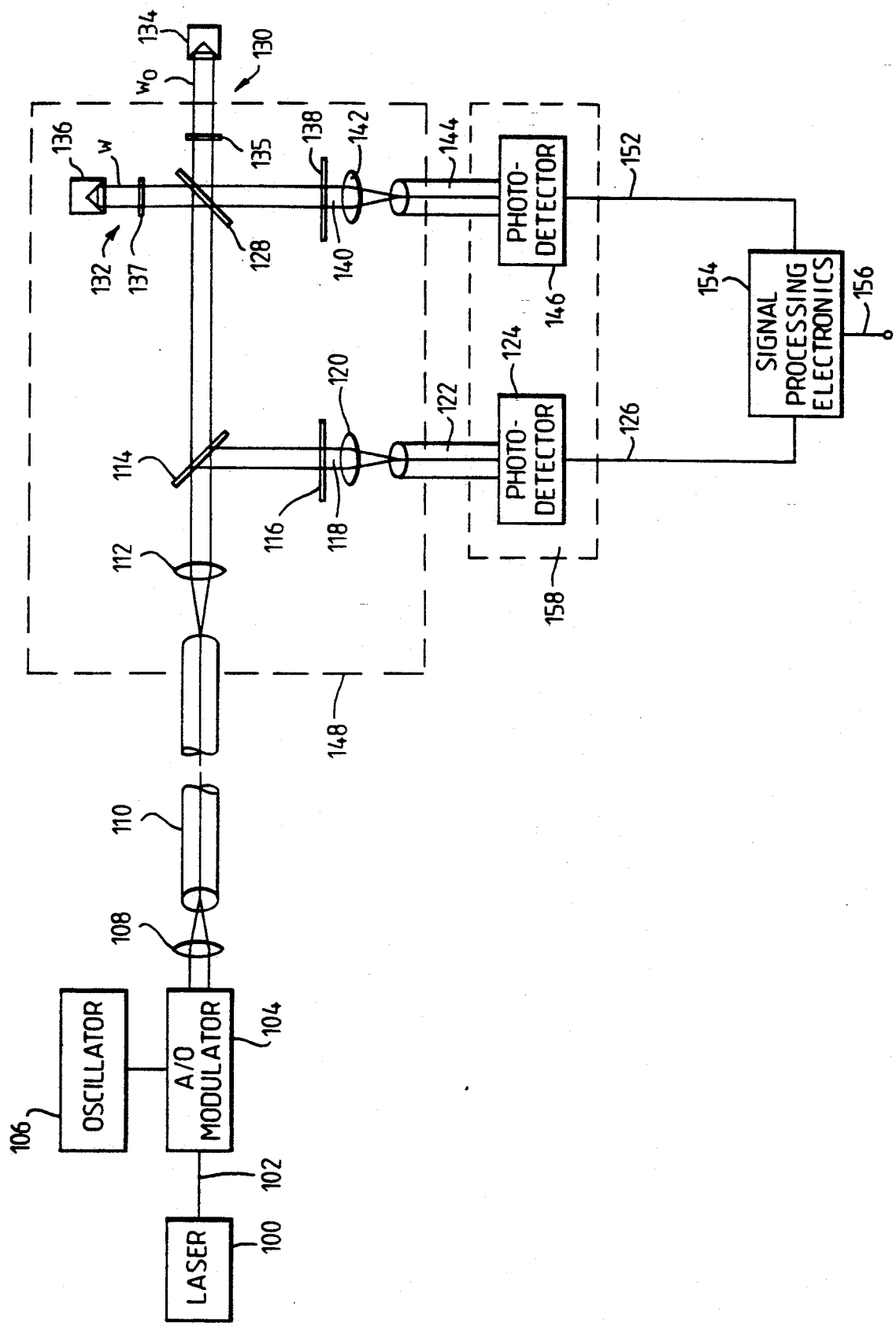

LASER INTERFEROMETER FOR MEASURING DISTANCE USING A FREQUENCY DIFFERENCE BETWEEN TWO LASER BEAMS

BACKGROUND OF THE INVENTION

1. Field of the Invention

The present invention relates to a dual-frequency laser interferometer, used for example to measure distance.

2. Description of Related Art

One such interferometer (see e.g. EP 194941) comprises a laser and an acousto-optic modulator which produce a pair of beams, orthogonally polarised with respect to each other, and having a difference in frequency of $\Delta\omega$. The two beams, by virtue of their different polarisations, are diverted down separate arms of a Michelson-type interferometer. The beam reflected from the measurement arm undergoes a frequency shift due to the Doppler effect when the retro-reflector of the measurement arm moves. By comparing the beat frequencies between the two beams before and after reflection from the two arms of the interferometer, the magnitude of movement of the measurement arm may be determined. The beat frequency of the two beams after reflection is determined by interfering the beams and detecting the intensity of the resultant interference beam with a photo-detector.

A problem with the apparatus described above is that the beat frequency of the two beams before reflection (i.e. the "reference beat frequency") is derived directly from an oscillator used to drive the acousto-optic modulator. The apparatus is thus highly sensitive to a change in the propogation time of the signal from oscillator, or the propogation time of the light beams from the acousto-optic device through the interferometer and the electrical signal from the photo-detector. A change in one of the propogation times not occurring in the other will cause a relative phase shift in the two signals and a consequent error in the value of the measurement. Such a circumstance may readily arise due to a change in temperature in one part of the apparatus, which effects the propogation time of one of the signals, and which is not experienced in the other part of the apparatus. For example, it has been found that a temperature change of approximately 1° c can cause a measurement error of about 0.3 microns. This is obviously undesirable in an apparatus which is intended to be a precision measurement apparatus.

It is also known (e.g. from U.S. Pat. No. 3,534,292) to provide a Zeeman-split laser which produced a pair of frequency-shifted orthogonally polarised beams. The beat frequency between the two beams is derived by interfering the beams, and detecting the intensity of the resultant interference beam with a photo-detector.

SUMMARY OF THE INVENTION

A first aspect of the present invention resides in deriving the beat frequency of the two beams in an acousto-optically modulated laser interferometer from the two beams themselves before reflection of the beams in the interferometer.

Accordingly, the present invention provides a laser interferometer comprising:

acousto-optic laser generating means providing a pair of laser beams, having a frequency shifted relationship, and being orthogonally polarised;

a reference arm and a measuring arm;

directing means for directing one of the beams along the reference arm, and the other of the beams along the measuring arm;

means for interfering the beams from the reference arm and the measuring arm to produce a measuring interference beam, and for producing a measuring signal corresponding to the intensity of the measuring interference beam;

means for producing a reference signal from a pair of laser beams having a frequency corresponding to the difference in frequency of the two beams; and means for combining the measuring and reference signals and for producing an output corresponding to the difference in frequency between the two.

Preferably, the reference signal will be derived by interfering the two beams before the beams are directed into the reference and measuring arms, and detecting the intensity of the resultant reference interference beam. Preferably the reference interference beam and measuring interference beam will be produced in the same cavity.

The output may be counted to produce a value indicative of the displacement of the measurement arm.

A second aspect of the present invention relates to the positioning of the reference signal means in a laser interferometer.

According to a second aspect of the present invention there is provided a laser interferometer comprising:

laser generating means for providing a pair of laser beams, having a frequency shifted relationship, and being orthogonally polarised;

a reference arm and a measuring arm;

directing means for directing one of the beams along the reference arm, and the other of the beams along the measuring arm;

interfering means for interfering the beams from the reference arm and the measuring arm to produce a measuring interference beam;

first detector means for producing a measuring output signal corresponding to the intensity of the measuring beam;

reference signal means for producing a reference signal from the pair of laser beams having a frequency corresponding to the difference in frequency of the two beams;

at least one monomode, polarisation preserving optical fibre for transmitting the beams from the laser generating means to the reference signal means; and processing means for combining the measuring and reference signals, and for producing an output corresponding to the difference in frequency between the two.

Because the reference signal is derived after the light beams have been transmitted by the polarisation preserving fibre, any phase-shift resulting from the transmission of the light through the fibre will be calibrated out. In the prior art system, such a phase shift would cause a measurement error.

BRIEF DESCRIPTION OF THE DRAWINGS

An embodiment of the invention will now be described, by way of example, and with reference to the sole FIGURE which shows a schematic representation of a laser interferometer according to a preferred embodiment of the present invention.

DESCRIPTION OF PREFERRED EMBODIMENTS

Referring now to the sole FIGURE, a laser 100 emits a beam 102 of single frequency stabilised light. Beam 102 is transmitted by an acousto-optic device 104, which is driven by an oscillator 106. The acousto-optic (A/O) device 104 also outputs a second beam having a frequency $\omega_0$ shifted from the frequency $\omega$ of the beam 102 by an amount $\Delta\omega$ the amount of the oscillator signal. The output beams from the acousto-optic device have orthogonal polarisation states. The acousto-optic device may be used along or with ancillary optics, (e.g. birefringent prisms). The two beams are then focused by a lens 108 into a monomode, polarisation preserving optical fibre 110, whose polarisation axes are aligned with the axes of polarisations of the beams emitted by the A/O device 104. Upon discharge of the beams from the fibre 110 the beams are collimated by a lens 112. A non-polarising beam splitter 114 diverts a fraction of the beams through a polaroid 116, oriented at 45° to the polarisation state of each of the beams, thereby to cause them to achieve an interfering condition in the form of reference interference beam 118. The reference interference beam 118 is then focused by a lens 120 into an optical fibre 122 (which may be a multimode fibre) which transmits the beam 118 to a photo-detector 124. The reference signal 126 emitted from the photo-detector thus corresponds to the beat frequency between the beams.

The fractions of the beams which pass undiverted through beam splitter 114 are divided by a polarising beam splitter 128. The beam of frequency $\omega_0$ is thus directed into the measurement arm 130 and the beam of frequency $\omega$ into the reference arm 132. The beams are reflected off retroreflectors 136 and 134 in the reference and measurement arms respectively, passing in each direction through quarter wave-plates 137 and 135 respectively and are recombined at beam splitter 128. The two reflected beams then pass through a polaroid 138 oriented at 45° to the polarisation state of each of the beams, thereby to cause them to achieve an interfering condition in the form of a measurement interference beam 140. The measurement interference beam is focused by a lens 142 into an optical fibre 144 (which may also be a multimode fibre) which transmits the beam to photo-detector 146. The measurement signal from the photo-detector 146 thus corresponds to the beat frequency between the beams.

The reference and measurement signals 126 and 152 of the photo-detectors 124 and 146 respectively are sent to a signal processor 154 which detects the difference between the frequencies of the signals 126 and 152, and outputs a further signal 156 accordingly, representative of the magnitude of movement of the retro-reflector 134.

It is desirable to position the reference detection optics 114, 116, 120 and measurement detection optics 128, 138, 142 in the same temperature controlled environment. To this end both sets of optics are provided in a single cavity 148. It is also desirable to position the photodetectors 124 and 146 within a single cavity 158; optical fibres 122 and 144 are preferably incorporated into a single cable. The immunity of the apparatus to temperature variations is thus enhanced.

The advantages of this embodiment of the present invention can be readily appreciated. Any temperature change which occurs locally in part of the apparatus will be calibrated out since the reference signal is derived from substantially the same location as the interference signal. It should be appreciated however that the provision of fibres 110, 122 and 144 are preferred features of this embodiment of the present invention and that considerable advantages may nonetheless be obtained without their use.

In a second preferred embodiment of the present invention the laser is a Zeeman-split laser, (thereby obviating the need for an acousto-optic modulator) with a quarter wave plate provided up-beam of the optical fibre 110 to linearly polarise the light beams emitted from the laser, and a half-wave plate to align the planes of polarisation of the beams with those of the fibre.

I claim:

1. A laser interferometer for measuring distance comprising:

acousto-optic laser generating means for providing a pair of laser beams, having a frequency shifted relationship, and being orthogonally polarised;

a reference arm provided by a reference reflector and a measuring arm provided by a measuring reflector;

directing means for directing one of the beams along the reference arm and the other of the beams along the measuring arm;

interfering means for interfering the beams reflected from the reference arm and the measuring arm to produce a measuring interference beam;

first detector means for producing a measuring output signal corresponding to the intensity of the measuring interference beam;

reference signal means comprising further interfering means, up-beam of the directing means, for interfering the beams and for producing a reference signal having a frequency corresponding to the difference in frequency of the two beams; and processing means for combining the measuring output and reference signals and for producing an output corresponding to the difference in frequency between the two.

2. An interferometer according to claim 1 further comprising at least one monomode, polarisation preserving fibre for transmitting the beams from the laser generating means to the further interfering means.

3. An interferometer according to claim 1 wherein said first mentioned interfering means and said further interfering means are each provided inside a single cavity.

4. An interferometer according to claim 3 wherein said reference signal means further comprises a second detector means for producing a reference output signal corresponding to an intensity of a reference interference beam, the first and second detector means provided outside said cavity, and the reference interference beam and measuring interference beam are each transmitted to the first and second detector means along an optical fibre.

5. An interferometer according to claim 4 wherein said first and second detector means are both provided inside a further cavity.

6. A laser interferometer, comprising:

laser generating means for providing a pair of laser beams having a frequency shifted relationship and being orthogonally polarised;

a reference arm and a measuring arm;

directing means for directing one of the beams along the reference arm and the other of the beams along the measuring arm;

interfering means for interfering the beams from the reference arm and the measuring arm to produce a measuring interference beam;

first detector means for producing a measuring output signal corresponding to the intensity of the measuring interference beam;

reference signal means comprising a further interfering means, up-beam of the directing means for interfering the beams, for producing a reference signal from the pair of laser beams, the reference signal having a frequency corresponding to the difference in frequency of the two beams;

at least one monomode, polarisation preserving optical fibre for transmitting the beams form the laser generating means to the reference signal means;

processing means for combining the measuring and reference signals for producing an output corresponding to the difference in frequency between the two; and a cavity housing said first mentioned interfering means and said further interfering means.

7. An interferometer according to claim 6 wherein the reference signal means further comprises second detector means for producing a reference output signal corresponding to the intensity of the reference interference beam.

8. An interferometer according to claim 6 wherein said laser-generating means comprises a Zeeman-split laser.

9. An interferometer according to claim 6 wherein said laser-generating means comprises a laser and an acoustooptic modulator.

10. An interferometer according to claim 7 wherein the first and second detector means are provided outside said cavity, and the reference interference beam and measuring interference beam are each transmitted to the first and second detector means along an optical fibre.

11. An interferometer according to claim 10 wherein said first and second detector means are both provided inside a further cavity.

* * * * *